United States Patent
Grocholski

Patent Number: 6,068,874
Date of Patent: May 30, 2000

[54] PROCESS OF DEHYDRATING BIOLOGICAL PRODUCTS

[75] Inventor: Vladimir Grocholski, Miami, Fla.

[73] Assignee: Dehydration Technologies, Inc.

[21] Appl. No.: 08/354,747

[22] Filed: Dec. 8, 1994

Related U.S. Application Data

[63] Continuation of application No. 08/018,243, Feb. 16, 1993, abandoned.

[51] Int. Cl.[7] .................................. A23B 7/00; F26B 3/00
[52] U.S. Cl. .............................. 426/465; 34/78; 34/196; 34/197; 34/219; 426/520
[58] Field of Search ............................. 426/465, 466, 426/640, 310; 34/218, 219, 224, 225, 196, 197, 78

[56] References Cited

U.S. PATENT DOCUMENTS

| | | | |
|---|---|---|---|
| 687,305 | 11/1901 | Hanrahan | 34/78 |
| 1,228,989 | 6/1917 | Tiemann | 34/78 |
| 1,471,602 | 10/1923 | Hanrahan | 34/78 |
| 1,902,575 | 3/1933 | Nichols | 34/219 |
| 2,184,473 | 12/1939 | Scanlan | 34/225 |
| 2,343,346 | 3/1944 | Touton | 34/224 |
| 2,418,683 | 4/1947 | Wilson | 34/219 |
| 3,202,157 | 8/1965 | Touton | 34/224 |
| 3,866,334 | 2/1975 | Huang | 34/219 |
| 4,153,549 | 5/1979 | Wang et al. | 210/54 |
| 4,207,684 | 6/1980 | Stice | 34/93 |
| 4,207,685 | 6/1980 | Pelsue et al. | 34/107 |
| 4,263,720 | 4/1981 | Bowling | 34/225 |
| 4,319,409 | 3/1982 | Scholz et al. | 34/58 |
| 4,334,861 | 6/1982 | Bricmont | 432/30 |
| 4,335,150 | 6/1982 | Hosaka et al. | 426/465 |
| 4,352,249 | 10/1982 | Rose | 34/225 |
| 4,496,597 | 1/1985 | Reges | 426/465 |
| 4,631,837 | 12/1986 | Magoon | 34/95 |
| 4,734,401 | 3/1988 | Blouin | 426/478 |
| 4,790,995 | 12/1988 | Sorensen | 426/310 |
| 4,820,627 | 4/1989 | McGeehan | 435/6 |
| 4,835,351 | 5/1989 | Smith et al. | 219/10.55 R |
| 4,889,730 | 12/1989 | Roberts et al. | 426/640 |
| 4,940,040 | 7/1990 | Randall et al. | 126/21 A |
| 4,948,609 | 8/1990 | Nafisi-Movighar | 426/640 |
| 4,949,629 | 8/1990 | Leary et al. | 426/510 |
| 4,959,230 | 9/1990 | Wyss et al. | 426/615 |
| 4,975,293 | 12/1990 | Hicks et al. | 426/271 |
| 4,988,522 | 1/1991 | Warren | 426/270 |
| 4,988,523 | 1/1991 | Gardner et al. | 426/270 |
| 5,000,974 | 3/1991 | Albersmann | 426/599 |
| 5,026,566 | 6/1991 | Roser | 426/640 |
| 5,038,498 | 8/1991 | Woolsey | 34/224 |
| 5,059,518 | 10/1991 | Kortright et al. | 435/6 |
| 5,227,183 | 7/1993 | Aung et al. | 426/310 |

OTHER PUBLICATIONS

Copson, "Microwave Heating in Freeze–Drying, Electronic Ovens, and Other Applications" Published by the AVI Publishing Co., Inc. 1962 (pp. 249–250).

*Primary Examiner*—George C. Yeung
*Attorney, Agent, or Firm*—Garrison & Associates PS; David L. Garrison

[57] ABSTRACT

A dehydration apparatus and process utilizing a closed system are provided and enable substantial dehydration of biological products while enabling retention of the essential flavor and fragrance of the natural product. The apparatus comprises a heat exchanger and dehydration chamber connected in closed fashion by appropriate conduits or ducting. Appropriate blowers are provided, as are controls for the system parameters of the dehydration process.

18 Claims, 2 Drawing Sheets

FIG. 1

PROCESS OF DEHYDRATING BIOLOGICAL PRODUCTS

This application is a continuation of application Ser. No. 08/018,243, filed Feb. 16, 1993, now abandoned.

BACKGROUND OF THE INVENTION

I. Field of the Invention

The present invention relates to dehydration via a closed system.

The present invention relates particularly to a method of and an apparatus for dehydrating biological products including, but not limited to: fruits, vegetables, fish and meat products, by employing a closed system. More particularly, the present invention relates to a method and apparatus for dehydrating such biological products, via a closed system in a manner such that substantially all of the natural moisture of the product is removed while the product retains substantially all of its natural flavors; and fragrances. Moreover, the present invention relates to a method and apparatus of dehydrating such biological products such that the fragrance and flavor of the natural biological product is retained upon rehydration of the dehydrated biological product.

The present invention also relates to dehydrated biological products per se, as well as those made by the above mentioned method of the present invention.

II. Description of the Prior Art

Many methods of, and apparatus for, preserving biological products, in particular food products, are presently utilized and have been known for some time. Each of the prior art methods of preserving for products has serious and significant shortcomings, which it is the object of the present invention to overcome.

Freezing is a commonly utilized method for preserving foods, and various freezing techniques are known in the prior art. In particular, a freezing technique including lyophilization is known in the prior art, particularly from U.S. Pat. No. 5,059,518. Such freezing procedures have several undesirable aspects. These include destructing or destruction of the integrity of the frozen products or materials as well as the need for constant energy expenditure for cooling of the frozen products during storage. Additionally, transportation of the frozen products is more complicated, and the presence of water within the frozen products results in an increase in the total costs for the process.

One of the oldest processes for preserving biological products, and particularly food products, is that of drying or dehydration. From ancient times, it has been known to dry grapes to produce raisins. Such drying processes are, of course, still quite widely practiced today. However, these dehydration or drying processes have serious and significant shortcomings. In particular, since drying processes as utilized today, employ an "open system", the fragrance, flavor and aroma of the product is often significantly changed, during the drying process, from that of the product in its natural state.

The term "open system", designates a drying process or apparatus that operates by utilizing a heated air flow across the surface of the product to be dehydrated and wherein the air flow is not isolated from the ambient atmosphere, but air exchange between the dryer and ambient air is permitted. While in many of these prior art "open systems", some air might be recycled for energy efficiency purposes, the prior art dehydration systems do not utilize a closed system, wherein the entire volume of air utilized for drying of the product is closed-off, isolated, or sealed from the ambient atmosphere and recycled, without exchange of air with the ambient atmosphere during a drying cycle.

Thus, in the prior art drying processes, as the evaporation of moisture from the product proceeds, flavor, fragrance and aroma are also evaporated from the product and are thus not retained in the dehydrated product. Accordingly, the taste, texture, flavor and aroma of a product dehydrated by conventional dehydration process becomes substantially changed as a result of the drying process. Accordingly, dehydrated products produced via the prior art dehydration processes cannot be reconstituted and used as a acceptable substitute for the natural product. Using the grape-raisin example, since the flavor and fragrance of a grape differs significantly from that of a raisin, a raisin is not an acceptable substitute for a grape in processed food products such as, for example ice cream and yogurt.

Other methods of preserving foods by drying include the addition of chemical compounds, such as, for example, trehalose or sulfite.

Additionally, preservation of foods by the addition of sugar during the drying process, while quite old, is still practiced in the art. However, because of the general trend, particularly for health reasons, to avoid the addition of chemicals or extra sugar to food products, these processes have recently become somewhat less desirable than in the past.

SUMMARY OF THE INVENTION

The present specification describes a dehydration process and apparatus utilizing a "closed system" which is free of the above noted disadvantages.

The present invention relates to a process of producing a dehydrated biological product having substantial flavor and fragrance retention.

The process includes enclosing a biological product to be dehydrated within an enclosure so as to comprise a closed system and forcing a gaseous fluid within the closed system to flow past the biological product until the moisture content of the biological product is reduced to a predetermined level, which can be about less than 10 percent moisture.

According to the present invention, the step of forcing includes heating of the gaseous fluid within the closed system, the step of heating includes utilizing a heat exchanger to impart heal: to gaseous fluid within the closed system, and the step of forcing includes providing a blower to blow the heated gaseous fluid past the biological product. In addition, the process can include the step of injecting a predetermined gaseous fluid into the closed system.

Further, the process can include the step of evacuating a predetermined gaseous fluid from the closed system, while the step of forcing a gaseous fluid to flow, can comprise monitoring the process parameters of the closed system. The present process also includes enabling samples of the biological product to be removed from the closed system while products are being dehydrated within the closed system, and enabling the biological product to be introduced into and removed from the closed system without substantially impairing the integrity of the closed system.

The present invention also relates to a dehydrated biological product produced in accordance with the process of the present: invention.

The predetermined level of the present invention can be a level at which the flavor and fragrance of the natural product is retained. Yet further, according to the present invention, the biological product can be two diverse biological products.

The present invention relates to a dehydration apparatus for a biological product, wherein the apparatus includes a mechanism for supporting a biological product to be dehydrated, a device for enclosing the support mechanism to form a closed system, and a device for heating a gaseous fluid within the closed system.

Further, the present invention includes an apparatus for causing the heated gaseous fluid of the closed system to flow past the support mechanism and the heating device is operative to heat the gaseous fluids of the closed system to a temperature of below about 80 degrees Centigrade. The flow causing apparatus includes at least one blower, while the heating device includes a heat exchanger.

Further, according to a feature of the present invention, the heating device and the causing apparatus are operative to achieve a temperature differential and forced fluid flow within the closed system. The present system further includes a device for removing gaseous fluid from the closed system, and for inserting and, removing biological products from the closed system without substantially impairing the integrity of the closed system. In particular, a double-door air-lock can be used to insert and remove biological products.

The present invention includes a mechanism for injecting a predetermined material into the closed system, and the predetermined material can be a bacteriostatic agent.

In addition, devices for monitoring a process parameter within the closed system and for insulating the closed system are provided.

The present invention relates to a dehydration apparatus for biological products, including a device for supporting a biological product to be dehydrated, a structure for forming a physically and thermally closed system about the supporting device, and a mechanism for creating and maintaining temperature and humidity gradients within the closed system.

The present invention also relates to a dehydrated biological product having substantially all the natural moisture removed, while retaining substantially all of the natural flavor of the biological product, as well as substantially all of the natural fragrance of the biological product. In addition, the natural flavor and the natural fragrance of the product be retained upon rehydration.

The present invention relates to subject matter disclosed in Disclosure Documents 297,343, 296,583, 296,850, and 297,343, filed Nov. 25, 26 and Dec. 9, 1991, respectively and entitled "Dehydration Process of Biological, Chemical and Pharmaceutical Materials" as well as in South African Provisional Patent: Application No. 93/8649, filed Nov. 24, 1992 and entitled "Dehydration Process, the entire disclosures which are expressly incorporated herein by reference in their entirety.

BRIEF DESCRIPTION OF THE DRAWING

The present invention is further explained in the detailed description which follows, with reference to the drawings, by way of non-limiting examples of the preferred embodiments of the present invention, in which like reference numerals represents similar parts in the following Figures, and wherein.

DETAILED DESCRIPTION OF THE PREFERRED EMBODIMENT

Dehydration is in essence the process of water release from a biological material through higher temperature evaporation caused by a forced air flow about the biological material, often in the presence of a pressure differential (positive or negative).

In the present application, the term biological products is used to refer to biological, chemical and pharmaceutical materials. Within the category of biological materials, food products such as various plant (fruit or vegetable) foods or diary products, seafoods and meats are included. In addition, herbs, spices, tobacco, fodder (alfalfa) and wood are also included within the general expression biological products. Yet further, within the term biological products, as utilized in the present specification, blood, vaccines, sperm, and bacteria are included.

Within the term chemical material, various chemicals, chemical compounds, and mixtures are included. Similarly, within the tern pharmaceutical products, various pharmaceutical substances, preparations, compounds, mixtures and materials are included.

Figure 1:
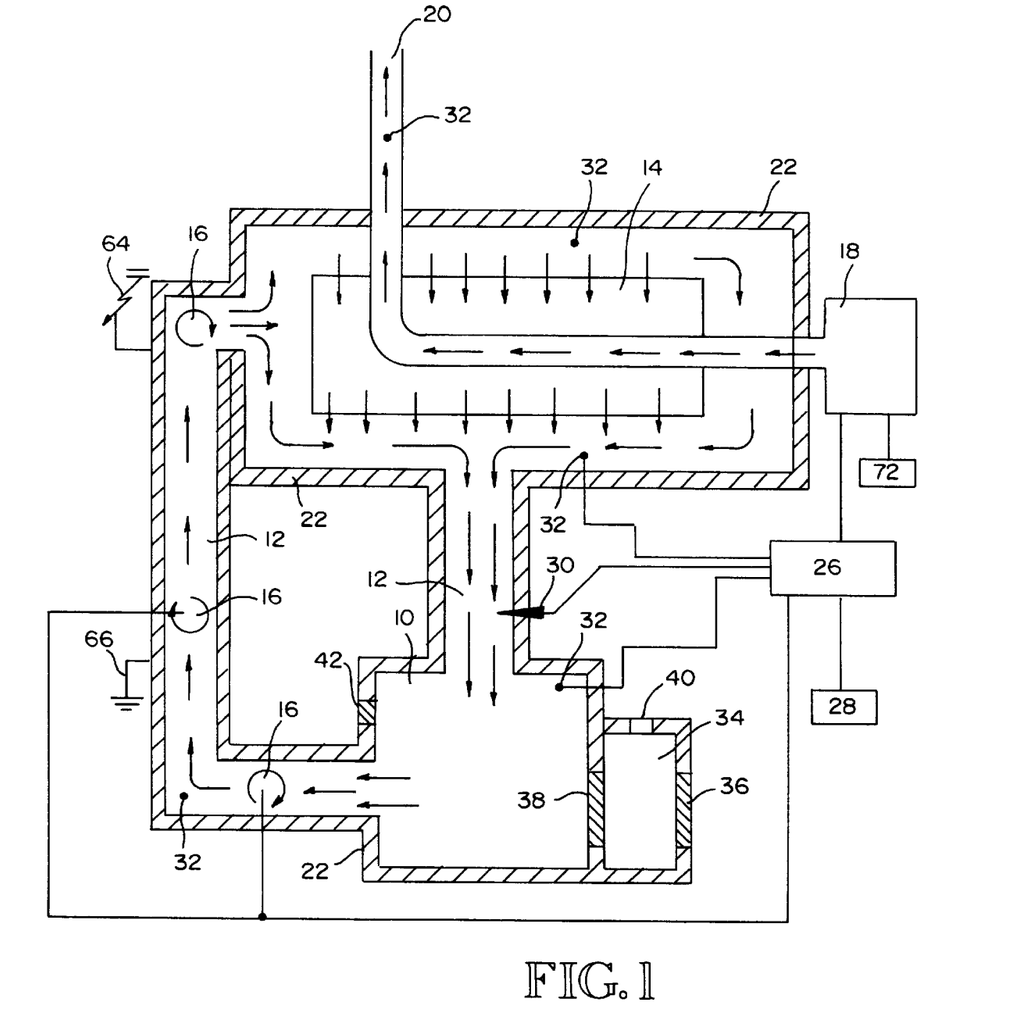
FIG. 1 is a schematic view of the dehydration apparatus of the present invention.

With detailed reference to the drawings, and in particular with reference to FIG. 1, there is illustrated, in non-limiting schematic form, a preferred embodiment of the present invention. In FIG. 1, a tunnel or product chamber 10 is shown, within which the biological product to be dehydrated can be supported on trays, racks, shelves or the like. As will be set forth in more detail, different types of products to be dehydrated require different types of support mechanisms.

The product chamber 10 is connected, by conduits or ducting 12, to a heat exchanger 14. Within the ducting 12, a plurality of blowers 16 are provided to provide a high-speed airflow within the chamber and throughout the system. Although in the illustrated schematic drawing of FIG. 1, three such blowers are provided, it is of course understood that more than three or less than three such blowers can be provided for moving the air from the product chamber 10 towards and to the heat exchanger 14 and back again to the product chamber after having been heated by the heat exchanger The blowers can be located in any appropriate portion of the conduit, as appropriate to provide a high-speed air flow in the product chamber 10.

The heat exchanger 14 is provided to heat the air moved by the blowers prior to returning the air to the product chamber 10. The heat exchanger is provided with a heating element, or any conventional heat source, such a diesel gas heater, electrical heater, direct or indirect solar heaters, including electrophotovoltaic and condenser devices.

The heater element is shown in FIG. 1 in the form of the heat generator 18. The heated fluid or exhaust gases from the heat generator 18 are shown as being emitted to the atmosphere from an exhaust port 20 through an appropriate (non-illustrated) emission control mechanism, although such exhaust port is only necessary for a heat generator or heating element using a consumable fuel. Of course, for a solar heater, an exhaust of this sort would not be necessary. Rather, the exhaust shown in FIG. 1 would be connected back to the heat generator 18 in closed-loop fashion.

After being heated by the fluid within the heat exchanger 14, the air within the system is returned at high speed to the product chamber 10. As noted above, the biological products to be dehydrated are supported within the product chamber 10. Each time the heated air flows over and about the biological product within the chamber, moisture from the product evaporates, is carried away by the air as water vapor, and the biological product within the chamber is progressively dehydrated.

Although in the previous discussion, air has been referred to, it is to be understood that it is also within the scope of the present invention to use other gaseous fluids rather than ordinary atmospheric air. In particular, as will be explained below in more detail, it is specifically within the contemplation of the present: invention to either remove various gaseous components of the air (e.g., oxygen) or to inject various other gases into the product chamber of the present invention. The term gaseous fluids, as used in the appended claims is intended to encompass air as well as other gaseous fluids.

The product chamber 10, the ducting 12 and the heat exchanger 14 are surrounded by appropriate insulation 22 to thus form a physically and thermally closed system. By a thermally and physically closed system, a system is defined whereby during a dehydration process utilizing the above described apparatus, the gaseous fluids within the system are continually heated, recycled, reheated and again recycled. Substantially no outside air is introduced into the closed system and none of the air or gaseous fluids within the system are exhausted into the outside atmosphere.

The closed system according to the present invention can be constructed such that the ducting or other parts of the system extend outside of the building containing the product chamber itself. Further, during the dehydration process, as a result of the changes resulting from the process, hydrogen atoms are liberated, and are present in the air of the product chamber and ducting. When such a system is located in an environment where severe thunderstorms are frequent, lighting can strike the exposed metal of the ducting or other parts of the system. To avoid the possibility of such an occurrence, which might be quite destructive in the presence of hydrogen, a conventional lighting arresting system is schematically illustrated in FIG. 1. Thus, a lighting rod 64 and a grounding connection 66 are schematically illustrated in FIG. 1. Further, separate lightning arresting systems can be provided both for the heat exchanger subsystem as well as for the closed system of the dehydrator of the present invention.

Every time a product-inserting access opening or door of the product chamber 10 is opened, there will obviously be an exchange of air between the chamber and the outside environment. Thus, in order to ensure the operation of the apparatus of the present invention at a high level of efficiency over an extended period of time and to avoid, as much as possible, introducing outside air into and disturbing the closed system, appropriate measures are taken in accordance with the teachings of the present invention to minimize such exchange of air. In particular, according to a preferred embodiment to the present invention, a double-door airlock system is provided.

The double-door airlock 34, as shown in FIG. 1, is provided with a first door 36 to enable communication between the airlock and the outside environment, while a second door 38 is provided to enable communication between the product chamber 10 and the airlock 34. Additionally, the double-door airlock is provided with all exhaust opening 40 through which, ambient air from the airlock can be exhausted, as by a non-illustrated suction pump.

In operation, the outer door 36 is opened, the biological materials to be dehydrated are positioned within the airlock, and the outer door 36 is closed. After the exhaust 40 has been operated to remove a portion of the air from the airlock 24, the inner door 38 is opened and the biological materials are moved into the product chamber. Thus, interchange of the air between the product chamber and the ambient environment is minimized.

It is of course understood that each of the doors 36, and 38 are provided with appropriate sealing mechanisms so as to further minimize the amount of air loss from the closed system.

In addition to the doors 36, and 38, an additional product sampling access opening or door 42 is provided in the product chamber 10. This door allows samples of the product undergoing dehydration to be withdrawn from the product chamber for analysis, to enable a determination to be made of the progress of the dehydration process. Because of the small size of the sampling door 42 and the relative infrequency with which it is opened, air loss therethrough is minimized. Of course, the door 42 is also provided with sealing means to further minimize air losses Further, although the sampling door 42 is illustrated to be in a wall portion of the product chamber 10, other than where the airlock is provided, it is of course possible and perhaps even preferable to provide the sampling door to be part of the airlock structure.

According to a further feature of the present invention, the biological product to be dehydrated is carried in trays which are supported on racks or carts which are connectable to and disconnectable from an endless loop-type conveyor. Thus, when the biological products are within the product chamber, they are connected to the endless loop chain conveyor, and, as the dehydration of the product supported on a particular rack is completed, it can be moved outside of the product chamber, disconnected from the conveyor, and a new rack, already loaded and waiting within the double door airlock can be connected to the conveyor and moved into the product chamber. Of course, the endless conveyor is driven by an appropriate drive mechanism which is not illustrated as it does not form a part of the present invention. The product chamber would, of course, be of a size to accommodate an appropriate number of racks or carts, such as 20–25 racks.

An exemplary tunnel or product chamber 10 can be constructed to hold 23 racks (i.e., carts), with each rack holding 21 trays, and each tray having a size of 44 inches by 44 inches.

Further, although the shape of the product chamber 10 as illustrated in FIG. 1, is illustrated to be of a square cross-section, it has been found that such a shape or a similar shape is particularly appropriate for products supported on trays and racks, as described above. Racks and trays are, however inappropriate for certain types of biological products to be dehydrated. Ill particular, when dealing with lightweight leafy-type products such as tea leaves, parsley, or rose petals, because of the velocity of the air flow within the product chamber, such biological materials would be blown off the support trays. Accordingly, a different mechanism for supporting these materials has been developed.

Figure 2:
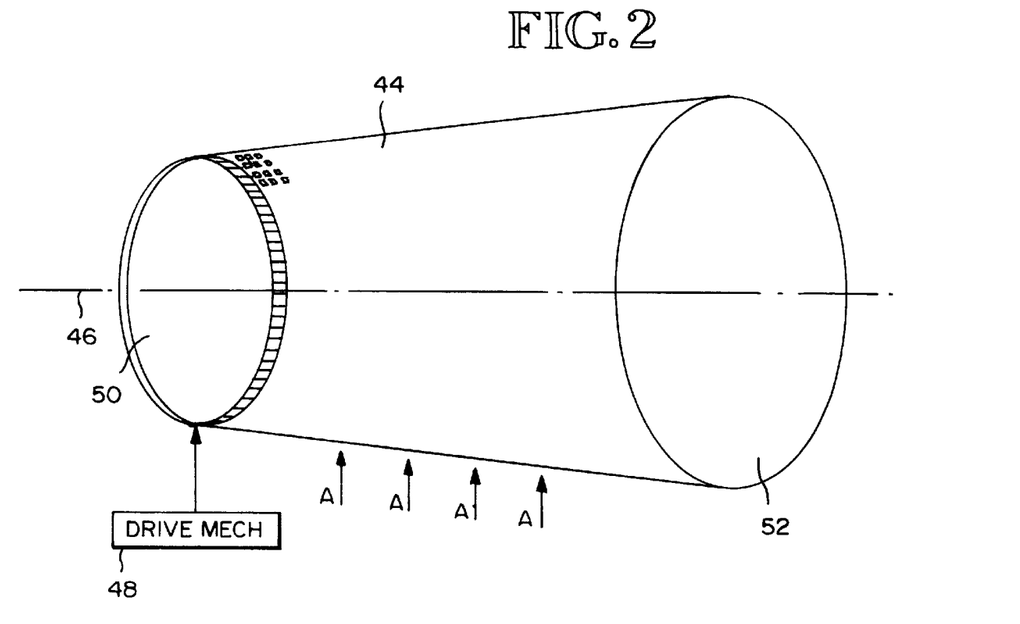
FIG. 2 is a schematic view of a support structure for certain biological products according to an embodiment of the present invention.

As illustrated in FIG. 2, a support mechanism for supporting lightweight, leafy-type biological materials for dehydration is provided. The support mechanism is generally in the form of an apertured diverging conical member or support screen 44. The conical member can be formed of a stainless steel screen or mesh, or a plastic screen or mesh of a grade acceptable for use in handling food. The conical support screen 44 is supported for rotation about a horizontal axis as generally shown at 46. Appropriate drive means 48, is provided for rotating the conical support screen. Although the drive is shown to be connected to the input end 50 of the support screen, it is of course understood that the support screen can be driven from either end or in any other conventional fashion, such as by a central shaft connected to each end of the support screen.

In utilizing the cylindrical support screen 44 for drying of leafy, lightweight biological materials, the screen is arranged so that the air flow from the heat exchanger impinges on the screen along the length thereof, as shown by the arrows A in FIG. 2. Materials to be dehydrated are inserted via the small input opening 50. As the screen 44 rotates while the air flow acts on the biological material through the apertures or interstices of the screen, the material gradually progresses down the slope of the conical support screen until it emerges from the large output end 52.

The support screen 44 should be oriented within the product chamber in such a fashion that the input and output ends are appropriately located relative to the double-door airlock to enable products to be dehydrated to be loaded, and dehydrated products to be unloaded therefrom. Of course, when using a conical support screen, it might be quite desirable to configure the product chamber to generally conform to the shape of the support screen so as to avoid impairing the air flow through the product chamber. Additionally, instead of the single airlock 34 as shown in FIG. 1, it might be desirable to utilize two separate airlocks; one provided adjacent each of the input and output ends of the cylindrical support screen 44.

Figure 3:
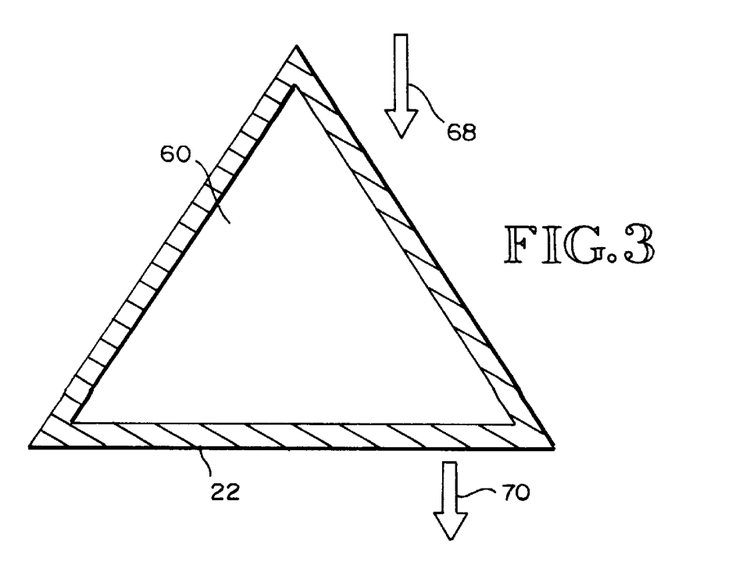
FIG. 3 is a schematic view of a cross-sectional shape of a product chamber for certain other biological products according to a further embodiment of the present invention.

It has further been found that for certain materials, such as wood, a triangularly-shaped product chamber achieves excellent results. When dehydrating wood in a triangularly-shaped product chamber, according to the teachings of the present invention, the wood becomes completely dried in a relatively short period to time, yet does not exhibit cracking curling or "cupping" as is often the case with other expedited wood drying processes. A triangularly-shaped product chamber 60 is illustrated in FIG. 3 together with the insulation 22 thereabout. An appropriately shaped support structure would be utilized for a triangularly shaped product chamber, to support the biological product, such as wood, during the drying thereof.

In treating wood within the triangularly shaped product chamber, as shown in FIG. 3, the air flow into the chamber would advantageously be from the upper portion 68 of the chamber and the exhaust (suction) would be from the lower portion 70 of the chamber. In those situations where the air inlet is at the left top side of the chamber the exhaust should be at the left lower side of the chamber, and vice versa. This arrangement of inlet and exhaust openings is believed to yield a particularly advantageous air flow within the chamber and results in quick drying of the wood without cracking of the wood during the drying process. It is believed that the arrangement of the inlet and exhaust openings as set forth above, together with the shape of the product chamber results in beneficial interaction of the air flow within the chamber with the walls disposed opposite to the inlet, and results in highly agitated air flow within the chamber without causing airflow dead spots within the chamber.

The transfer of heat to the gaseous fluids within the closed system of the present invention is performed through an interfaces with the heat exchanger 14, such as by utilizing fins, coils or other conventional heat exchanger technology.

Insulation 22, encompassing the entire closed system comprising the product chamber 10, the conduits 12, and the heat exchanger 14 is provided to assure the thermal efficiency of the system and to provide a thermally closed system.

Various sensors 32, appropriately positioned, are provided for measuring system or process parameters, such as temperature, forced air flow rate, absolute and relative humidity, as well as air pressure within the closed system. These sensors are used to monitor the system or process parameters under the general direction of a general purpose control computer 26 utilizing, e.g., micro processor technology, to control the heat generator and the blowers, as well as to monitor the progress of the dehydration process with respect to the particular biological product being dehydrated within the product chamber 10. While several sensors are illustrated in FIG. 1, the illustrated number and placement of such sensors is not limiting. On the contrary, the sensors can be positioned where desired, in accordance with conventional control system design technology.

The control computer 26 is optionally provided with a graphic display 28 for recording the various parameters and other data of the closed system. Further, the computer 26 can be designed and programmed in a conventional fashion to utilize the system parameters measured and monitored by the various sensors 32 to optimize the combination of such parameters for a given material undergoing the process of dehydration. In other words, the temperature and the air flow rate of the closed system can be controlled in accordance with the particular characteristics of the materials to be treated, under the control of computer 26.

The present invention utilizes two control loops. The first control loop is embodied in the various sensors 32 and the computer control 26. The array of sensors provide constant monitoring of the temperature, absolute and relative humidity in different areas of the chamber as well as around the heater and around the product being dehydrated. Constant monitoring is also provided of the speed of the air flow within the closed system, around the dehydrated product, and about the heat exchanger and the blowers.

A further control loop involves the intermittent sampling of the quality of material at predetermined stages of the dehydration process. The sampling port 42 is provided to enable samples to be removed from the closed system at predetermined intervals during the progress of the dehydration process. These samples are analyzed with respect to the degree of dehydration, sterility and other matters relating to the quality control of the product. The results of the analysis can be used to more accurately control the system parameters via the computer control 26.

The heat exchanger 14, is of course, part of a separate system that is merely in thermal interfacing contact with the air of the closed system of the present dehydration apparatus. The heat: exchanger system includes the heat generator 18 and, if necessary, an emission control unit and a control system 72 for the heat generator. The control system will of course include, an appropriate power source or supply, such as for example, 220 volts AC.

According to a significant feature of the present method and apparatus, since dehydration takes place in a closed system, one or more injectors 30, can be provided for delivery, into the product chamber 10, of bacteriostatic agents or supplementary flavoring agents. The injectors 30, can of course be operated under the control of the control computer 26.

In carrying out the dehydration process according to a preferred embodiment of the present invention, and in utilizing the above-described apparatus utilizing the closed system, humidity and temperature differentials are established before the product to be dehydrated is introduced into the closed system, and the differential is maintained while the product is being dehydrated. In particular, the heat exchanger serves as a humidity sink and as a heat source. Thus, the heat exchanger is actuated to raise the temperature of the product chamber before the product to be dehydrated is introduced into the system.

Because of the imbalance in humidity resulting from the humidity sink as well as the temperature imbalance due to the heat exchanger, the closed system is not in a state of equilibrium. Accordingly, the principle of Le Chetalier applies to the closed system of the present invention. Le Chetalier's principle states that when a disturbance is imposed on a system in equilibrium, the equilibrium shifts in such a way as to undo, in part, the effect of the disturbance. The evaporation of moisture occurs in accord with this principle and is driven by the temperature and humidity differentials.

The humidity and temperature differentials introduced by the heat exchanger and maintained between the heat exchanger and the product to be dehydrated in the product chamber 10, together with the rapid air flow over the product, results in the dehydration of the product without significant chemical changes which would result in the deterioration and impairment of the flavor and fragrance of the product being dehydrated. In other words, to a significant degree, the evaporation of the volatile chemical flavor and fragrance agents, which usually occur together with the evaporation of moisture from the product, is prevented.

In addition to the use of the injectors 30 to deliver bacteriostatic agents into the forced air flow passing over the biological product supported within the product chamber 10, the injectors can be used to introduce predetermined gases into the chamber to assist in ripening and to facilitate the drying of the product, as well as to impart particular flavors to the product. Moreover, evacuation of oxygen from the closed system is possible, in conjunction with the injection of a gas, such as nitrogen or helium, therein, to enable the dehydration process to take place in an oxygen-less environment. Thus, oxidation of the material being dehydrated in the product chamber 10 can be prevented or minimized.

Although in the present disclosure, the term "biological product" is used, it is of course within the contemplation of the present invention that diverse biological products be dehydrated at the same time in the apparatus illustrated in FIG. 1. Thus, for example, different fruits can be dehydrated together, such co-dehydration will result in a blending of the respective volatile chemical compounds and of the respective flavors and fragrances of the diverse products being dehydrated therein. The choice of products to be co-dehydrated is of course virtually limitless and is bound only by the users imagination. Obviously, more than two products can also be dehydrated at the same time with corresponding co-mingling flavors and fragrances.

Additionally, according to another feature of the present invention, the pressure of the air or gaseous fluids within the closed system of the present invention can either be increased or decreased in accordance with the dehydration of a particular product.

In particular, in certain applications, a higher than atmospheric pressure should be maintained in the closed system of the present invention. This has been found to be particularly advantageous with respect to the drying of wood. In such applications, the air pressure within the closed system is raised to about two atmospheres of pressure. Further, in the drying of wood, it has also been found advantageous to lower the air pressure, from two atmospheres, to somewhat less than atmospheric pressure just prior to the end of the drying process. This procedure was found particularly effective, and has produced fully dried 4×4's in about 24 hours. Appropriate suction pumps and or blower controls, or other conventional apparatus can be included in the closed system illustrated in FIG. 1, to enable such pressures to be achieved and maintained.

A significant feature of the present invention is the air flow rate that is maintained within the closed system by the blowers. Generally, the blowers are utilized to provide a high speed air flow within the system and about the product to be dehydrated. In most applications, the particular speed of the air flow is not critical to dehydration process. In those cases where the air flow high speed is important, it is merely necessary to ensure that the air flow speed within the closed system is not so great as to result in disturbance of the material being dehydrated. In other words, the air speed should not cause the material to be blown about the product chamber 10.

As noted above, the heat exchanger 14 serves to raise the temperature of the air being circulated by the blowers 16 through the closed system of the present invention. The temperature differential provided by the heat exchanger is of course essential to the efficient operation of the present invention. Nevertheless, a large temperature differential is not necessary. In particular, in many situations, a rather small temperature differential is utilized. Specifically, temperatures in the range of about 60 to 75 degrees Centigrade are used and achieve acceptable dehydrated products. For many food and vegetable products, a temperature of about 65 degrees Centigrade (149 degrees Fahrenheit) yields acceptable results.

Moreover, in some instances, temperatures above 80 degrees Centigrade result in discoloration of the biological product, thus rendering the dehydrated product less acceptable than a product processed at lower temperatures. Additionally, when dealing with dehydration of a living biological product such as sperm or bacteria, an elevated temperature can result in the killing of product. Thus, the temperature of dehydration must be maintained below such killing temperature. Similarly, for blood, temperatures below 80 degrees Centigrade must be utilized (=176° F.)

It is of course understood that when dehydrating products such as blood, bacteria or sperm, appropriate measures must be taken to avoid contamination of the dehydrated product. Conventional sterilization methods and apparatus can be used for this purpose and are expressly within the contemplation of the present invention.

By virtue of the computer 26, the control system associated with the present invention, as well as the samples removed via the door 42, the degree of dehydration of the product can be monitored or controlled. In accordance with the degree of dehydration obtained, the final characteristics of the product can be controlled. Thus, if a particular product is allowed to remain within the dehydration apparatus of the present invention until about only one or two percent of the moisture of the product remains, the product will be crisp. On the other hand, if the dehydration process is stopped (i.e., the product is removed from the system) when eight to nine percent of the moisture of the product remains, the product will be softer. This will, of course, influence the texture and feel of the dehydrated product. It is of course understood that the time necessary to dehydrate a given product to a desired degree of dehydration is of course dependent, among other things, upon the physical structure of the product and the manner in which it has been prepared (i.e., sliced, cubed, etc).

The method of moving the racks and trays carrying the product to be dehydrated into and out of the product chamber via the double-door airlock 34 can be in accordance with conventional materials handling techniques. In an exemplary embodiment, it is contemplated that the racks would be linked in train fashion and/or would be attached to an endless conveyor to move them into the chamber, progressing intermittently along the length of the chamber, and finally out of the chamber after the dehydration process is completed. Thus, removal of a cart or rack at one end of the tunnel would provide room for the insertion of the new cart or rack at the other end of the tunnel, via the airlock. Of course, different methods of inserting and removing the biological product into the product chamber are clearly within the contemplation of the present invention.

Thus, it is certainly possible, and within the scope of the teachings of the present invention, to utilize the present dehydration apparatus and method in a batch fashion. In other words, one batch of product can be dehydrated, the system opened, the product removed and the system closed, heated, and a new product introduced therein. This is somewhat less efficient than the above-mentioned method utilizing racks which are sequentially inserted in a substantially continuous, albeit intermittent fashion.

A number of biological products have been dehydrated in a closed system in accord with the teachings of the present invention. All of the following products were dehydrated at a drying temperature of about 65 degrees centigrade, for about 3–4 hours, unless otherwise noted. As used herein, the term, dehydration ratio, refers to a weight reduction ratio. In other words, 20 lbs. of biological product reduced to 1 lb. of dehydrated material is designated as a dehydration ratio of 20:1.

1. Pineapple rings (⅜ inch) were dehydrated to a dehydration ratio of 16:1.
2. Pineapple tidbits were dehydrated to a dehydration ratio of 20:1.
3. Banana chips were dehydrated to a dehydration ratio of 10:1.
4. Banana figs were dehydrated to a dehydration ratio of 5:1.
5. Watermelon tidbits were dehydrated to a dehydration ratio of 30:1.
6. Shrimp heads (meal) were dehydrated for 3 hours to a dehydration ratio of 8:1.
7. Carrots were dehydrated for 2–3 hours to a dehydration ratio of 15:1.
8. Tomatoes were dehydrated to a dehydration ratio of 19:1.
9. Cabbage was dehydrated to a dehydration ratio of 22:1.
9. Celery was dehydrated to a dehydration ratio of 31:1.
10. Green peppers were dehydrated to a dehydration ratio of 20:1.
11. Spinach (leaves) were dehydrated to a dehydration ratio of 21:1.
12. Green beans were dehydrated to a dehydration ratio of 13:1.

Dehydration by the method and by means of the closed system of the present invention results in the retention of substantially all of the volatile chemicals which comprise the flavor and aroma of the natural (i.e., undehydrated) biological product. The partial pressure of these volatile chemical substances from the material or product being dehydrated, reach a level of complete saturation in the early stages of the dehydration process. Achievement of complete saturation of the volatile chemical flavor and fragrance compounds prevents further substantial chemical changes from occurring within the dehydrated material. Thus, the dehydrated material retains substantially all of the essential fragrances and flavoring oils therein. This is a significant and substantial feature and a major advantage of the present invention over the prior art open system type dehydration process and apparatus.

Once the partial pressure of the volatile chemical substances from the dehydrating material reach a level of complete saturation, further evaporation of such substances and further substantial chemical changes within the materials to be dehydrated are prevented. Accordingly, dehydrated materials produced in accordance with the present invention retain substantially all of their fragrance and flavorings.

As a result of the use of the method and apparatus of the present invention, because most of the volatile chemicals substances making up the flavor and fragrance of the biological product being dehydrated are retained within the product during the dehydration process, the flavor and aroma of the resultant dehydrated product is highly concentrated and very intense. Upon rehydration, the flavor and fragrance of the product are restored essentially to their original levels. Thus, the dehydrated products of the present invention are particularly well suited for use as flavoring in yogurt and ice creams as well in may other food processing technology applications.

The method and apparatus of the present invention can be applied to a virtually limitless variety of fruits and vegetables, to mention only one small category of the biological products noted above. With respect to each of these diverse fruits and vegetables, different drying times will ordinarily be applicable, depending on the structure and the prepared size of the product. The appropriate drying time, in view of the above variables as well as in view of the desired final product characteristics, can be readily determined. Such determinations per se are not an essential aspect the present invention.

As noted above many products can be suitably dehydrated for about four hours. Obviously, other products require different periods of time. For example, grapes require about 12 hours because of the relative impermeability of the grape skin. On the other hand, materials such as coconut need only be dehydrated for about 2 hours. Obviously, the optimum dehydration time for various materials can readily be determined by one utilizing the present invention. Similarly, the efficiency of the system will also have a significant effect upon the drying time. Good results are obtained in a system where the chamber is preheated prior to the introduction of the biological material as by use of the air lock disclosed in FIG. 1. On the other hand, it is possible, as noted above, to operate the present invention in a batch fashion where biological product is introduced into the chamber and the heat exchanger is then turned on to produce the temperature and humidity gradients.

For certain materials that are particularly susceptible to discoloration due to oxidation, such as potatoes, apples, and bananas, it is further advantageous to perform the pre-dehydration processing of the materials in a relatively oxygen-free environment. In particular, it has been found beneficial in the processing of potatoes, to perform the pre-hydration processing (i.e., the peeling, cutting, or cubing) of the potatoes in an environment from which approximately ⅓ of the oxygen has been removed, such as by an appropriate suction pump. The removal of approximately ⅓ of the oxygen from the ambient air results in significant decrease in discoloration and oxidation of the cut surfaces of the potato and accordingly results in an extremely white dehydrated potato flake. Thus, according to a further feature of the present invention, the processing of the potatoes (i.e. peeling, cutting, etc.) can take place in an area similar to the air lock previously disclosed. As set forth above, the air lock of the present invention is designed to have a significant portion of the air (and thus oxygen) removed. In a particularly advantageous embodiment, approximately ⅓ of the air from the air lock is removed, prior to opening of the inner door and insertion of the biological materials into the product: chamber 10. Thus, a similar area, that is oxygen-deprived is particularly well suited for processing such materials.

While the present invention has above been described as applicable to various specific food type products, it is understood that its applicability is not limited to such food products. The present invention is particularly applicable to citrus products such as oranges and limes, as well as mushrooms, algae, seaweed, apple, pineapple, watermelon, grapes, carrots, and broccoli. Various meats can be dehydrated using the present invention, such as beef, pork and poultry. Similarly, seafoods and seaweeds can be dehydrated. Shrimp and shrimp heads, when dehydrated, have been found to be a useful ingredient in fish sauces and other food preparations.

Dairy products such as milk and eggs can also be dehydrated by the present invention. In addition, herbs, spices, seeds, tea, coffee and coco can also be dehydrated by the present invention, as can tobacco, fodder and wood. Fish eggs and frog eggs can also be dehydrated by the present invention. As noted above, the above listing of products is not exclusive in any manner, form or shape, but is merely intended to be exemplary of the diverse nature of products to which the present invention is applicable.

Finally, while the present invention has been described with particular application to dehydration, it is to be noted that the apparatus and method described as forming an integral part of the present invention are also particularly well suited for application to a smoking operation utilizing a smokehouse. Such smoking operations are commonly utilized to preserve and flavor fish and meats.

In prior art smokehouses, a wood fuel such as hickory or mesquite wood is burned and the smoke of the combustion of the wood is permitted to permeate the product to be smoked. After permeating the product, the smoke is vented to the atmosphere.

According to the present invention, the use of a closed system is directly applicable to a smokehouse and can readily embody the teachings of the present invention by merely deleting the heat exchanger and providing means for the combustion smoke into the closed system so that the air carrying the combustion smoke will be circulated about and around the product to be smoked, so that the product becomes permeated thereby.

While the present invention has been described in its preferred embodiments, it is understood that the words which have been used herein are words of description rather than words of limitation. Changes may be made within the purview of the appended claims without departing from the scope and spirit of the invention in its broader aspects. Although the invention has been described herein with reference to particular means, materials and embodiments, it is further understood that the invention is not to be limited to the particulars disclosed herein, and that the invention extends to all equivalents within the scope of the appended claims.

What is claimed is:

1. A process of producing a dehydrated biological product having substantial flavor and fragrance retention, said process comprising:

providing a dehydration chamber defined by walls totally enclosing the biological product to be dehydrated during the entire period of dehydration, thereby defining a closed system, enclosing the biological product to be dehydrated within the dehydration chamber; and forcing a gaseous fluid within the closed system to flow past the biological product, within the dehydration chamber, until the moisture content of the biological product is reduced to a predetermined level, without introducing moisture into the dehydration chamber or removing moisture from the dehydration chamber during the entire period of dehydration, the step of forcing including heating the gaseous fluid within the closed system to impart heat to the gaseous fluid and utilizing a blower to blow the gaseous fluid past the biological product in the dehydration chamber.

2. The dehydration of claim 1, wherein the step of heating includes utilizing a heat exchanger to impart heat to gaseous fluid within the closed system.

3. The dehydration process of claim 1, further including enabling samples of the biological product to be removed from the closed system while a product is being dehydrated within the closed system.

4. The dehydration process of claim 1, further including the step of enabling a biological product to be introduced into and removed from the closed system without substantially impairing the integrity of the closed system.

5. The dehydration process of claim 1, said predetermined level being about less than 10 percent moisture.

6. The dehydration process of claim 5, said predetermined level comprising a level at which the flavor and fragrance of the natural product is retained.

7. The dehydration process of claim 1, the biological product comprising two diverse biological products to flow past the biological product includes forcing a combustion smoke to flow within the -closed system around and about the biological product so that the biological product becomes permeated by the combustion smoke.

8. The dehydration process according to claim 1, the biological product comprising an edible food product.

9. The dehydration process according to claim 1, further including the step of removing the biological product from the closed system while inhibiting ambient air flow into the closed system.

10. The dehydration process according to claim 9, further including the step of inhibiting ambient air flow into the closed system during introduction of the biological product into the closed system.

11. The dehydration process according to claim 1, wherein the step of heating comprises heating the gaseous fluid of the closed system to a temperature of below about 80° C.

12. The dehydration process according to claim 1, wherein the, step of forcing a gaseous fluid within the closed system to flow pass the biological product comprises achieving a temperature differential and forced fluid flow within the closed system.

13. The process of producing a dehydrated biological product according to claim 1, wherein the step of forcing a gaseous fluid to flow past the biological product includes maintaining the biological product within the dehydration chamber in a state of inequilibrium.

14. The process of producing a dehydrated biological product according to claim 1, wherein the fragrance and flavor of the product are retained upon rehydration of the biological product.

15. The process of producing a dehydrated biological product according to claim 1, wherein the step of forcing the gaseous fluid to flow past the biological product includes forcing a combustion smoke to flow within the closed system around and about the biological product so that the biological product becomes permeated by the combustion smoke.

16. The process of producing a dehydrated biological product according to claim 1, wherein the step of providing a dehydration chamber comprises providing a dehydration chamber of a generally triangular cross-section.

17. The process of producing a dehydrated biological product according to claim 1, wherein the step of enclosing a biological product within the dehydration chamber comprises supporting the biological product within the dehydration chamber.

18. The process of producing a dehydrated biological product according to claim 17, wherein the step of supporting the biological product within the dehydration chamber includes the step of supporting the biological product on an inner surface of a cone-shaped drum, and rotating the cone-shaped drum about an axis transverse to the direction of gaseous fluid flow within the dehydration chamber.

* * * * *

UNITED STATES PATENT AND TRADEMARK OFFICE
CERTIFICATE OF CORRECTION

PATENT NO. : 6,068,874
DATED : May 30, 2000
INVENTOR(S) : Vladimir Grocholski

It is certified that error appears in the above-identified patent and that said Letters Patent is hereby corrected as shown below:

Claim 7, Column 14,
Lines 42-46, delete "to flow past the biological product includes forcing a combustion smoke to flow within the –closed system around and about the biological product so that the biological product becomes permeated by the combustion smoke".

Claim 12, Column 14,
Line 62, delete the "," (comma) after "step".

Signed and Sealed this

Thirty-first Day of July, 2001

*Attest:*

Nicholas P. Godici

NICHOLAS P. GODICI

*Attesting Officer* *Acting Director of the United States Patent and Trademark Office*